United States Patent
Shibasaki et al.

(10) Patent No.: US 7,110,755 B2
(45) Date of Patent: Sep. 19, 2006

(54) INFORMATION PROCESSING SYSTEM, INFORMATION PROCESSING METHOD OF INFORMATION PROCESSING SYSTEM, INFORMATION PROCESSING APPARATUS, AND INFORMATION PROCESSING PROGRAM

(75) Inventors: Hiroaki Shibasaki, Tokyo (JP); Kenichi Kawasaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 440 days.

(21) Appl. No.: 10/199,335

(22) Filed: Jul. 22, 2002

(65) Prior Publication Data
US 2003/0032419 A1 Feb. 13, 2003

(30) Foreign Application Priority Data
Aug. 7, 2001 (JP) .......................... P.2001-239187

(51) Int. Cl.
*H04B 1/00* (2006.01)
(52) U.S. Cl. .................. 455/420; 455/41.2; 455/345; 381/86
(58) Field of Classification Search ........ 455/418–420, 455/414.1, 3.06, 41.2, 41.3, 556.1, 500, 507–508, 455/421, 3.03, 569.2, 99, 149, 151.2, 151.4, 455/345; 381/86
See application file for complete search history.

(56) References Cited
U.S. PATENT DOCUMENTS

| | | | |
|---|---|---|---|
| 6,069,896 A * | 5/2000 | Borgstahl et al. ........... 370/401 |
| 6,640,099 B1 * | 10/2003 | Sato ........................... 455/420 |
| 6,684,060 B1 * | 1/2004 | Curtin ........................ 455/3.06 |
| 6,697,638 B1 * | 2/2004 | Larsson et al. ........... 455/553.1 |
| 6,751,546 B1 * | 6/2004 | Yamashita ................... 701/200 |
| 6,754,468 B1 * | 6/2004 | Sieben et al. ............... 455/41.2 |
| 6,829,475 B1 * | 12/2004 | Lee et al. .................... 455/419 |
| 6,937,732 B1 * | 8/2005 | Ohmura et al. ............... 381/86 |
| 2002/0180803 A1 * | 12/2002 | Kaplan et al. ............... 345/810 |
| 2003/0032460 A1 * | 2/2003 | Cannon et al. ............. 455/569 |
| 2005/0202783 A1 * | 9/2005 | Yueh ......................... 455/41.3 |

FOREIGN PATENT DOCUMENTS

EP 1 024 628 A1 8/2000

OTHER PUBLICATIONS

"Profiles" Bluetooth Specification V1.0B, Online! Dec. 1, 1999, p. 1, 61-94, 355-385, Specification vol. 2, XP002263640.

* cited by examiner

Primary Examiner—George Eng
Assistant Examiner—Brandon J. Miller
(74) Attorney, Agent, or Firm—Sughrue Mion, PLLC

(57) ABSTRACT

A car audio apparatus forms a piconet together with information terminals that can communicate information with the car audio apparatus using a BT radio communication system so that information can be communicated in the piconet, acquires the attribute information of each information terminal that can communicate information with the car audio apparatus, and determines and collects music files that can be played in the car audio apparatus based on the attribute information. A list of the obtained music files is displayed on a display section of the car audio apparatus.

39 Claims, 8 Drawing Sheets

FIG. 6

| TRACK NO. | TITLE | ARTIST NAME | PLAY TIME (MIN. : SEC.) | FORMAT |
|---|---|---|---|---|
| Tr1 | &%!$#%& | #%&# | 4:36 | MP3 |
| Tr2 | &%%%&%& | #%&# | 5:21 | AAC |
| Tr3 | &%!##%& | #%&# | 4:28 | MP3 |
| Tr4 | &&&$#% | #%&# | 4:28 | MP3 |
| Tr5 | %$&#&$$ | #%&# | 3:52 | MP3 |

~600

INFORMATION PROCESSING SYSTEM, INFORMATION PROCESSING METHOD OF INFORMATION PROCESSING SYSTEM, INFORMATION PROCESSING APPARATUS, AND INFORMATION PROCESSING PROGRAM

The present disclosure relates to the subject matter contained in Japanese Patent Application No. 2001-239187 filed Aug. 7, 2001, which is incorporated herein by reference in its entirety.

BACKGROUND OF THE INVENTION

1. Field of the Invention

This invention relates to an information processing system for processing content of music data, etc.

2. Description of the Related Art

For example, a car audio apparatus 90 shown in FIG. 9 is available as a car audio apparatus (information processing apparatus) in a related art. The car audio apparatus 90 comprises a system control section 901 for controlling components of the car audio apparatus 90, an operation section 907 for accepting user's operation and inputting data or a command, an external storage section 903 for reading record information from various record media such as CD-ROM (Compact Disc-Read-Only Memory), MD (Mini-Disk), and DVD-ROM (Digital Versatile Disc-Read-Only Memory) and outputting the read record information to the system control section 901, a data processing section 909 for compressing and decompressing data, an internal storage section 905 storing various pieces of data of a general car audio apparatus, a playback section 911 for playing the record information read from the external storage section 903 and outputting to loudspeakers, etc., and a display section 913 for displaying various pieces of data on a display, etc.

Next, data playback processing of the car audio apparatus 90 in the related art will be discussed. To play the music data recorded in the external storage section 903, a command based on operation through the operation section 907 by the user is input to the system control section 901, which then reads the music data from the external storage section 903 based on the command, and the playback section 911 outputs the read music data to the loudspeakers, etc.

The external storage section 903 of the vehicle-installed car audio apparatus 90 in the related art described above may be placed in a predetermined location in the vehicle at a distance from the operation section 907 of a console panel, etc., via a cable, etc. The external storage section 903 can transfer data to and from the system control section 901 via a cable and the car audio apparatus 90 plays the music data recorded on the record medium such as CD-ROM or MD in the external storage section 903 for the user.

In recent years, it has been made possible to store music data in an information terminal such as a mobile telephone or a PDA (Personal Digital Assistant) and play the music data. Thus, there is a demand for an information processing apparatus that can determine whether or not a music file from the information terminal can be played in the self-terminal and input any desired music data from the information terminal so that the user can listen to the music piece.

It is therefore an object of the invention to provide an information processing system that can search for an information terminal that can communicate information with an information processing apparatus, establish information communications, determine and collect content which is contained in the information terminal and can be processed in the information processing apparatus, and easily prepare a content information list, an information processing method of the information processing system, information processing apparatus, and an information processing program.

SUMMARY OF THE INVENTION

To the end, according to a first aspect of the invention, there is provided an information processing apparatus for processing any desired content, comprising:

terminal search means for searching for an information terminal that can communicate information with the information processing apparatus;

attribute information acquisition means for acquiring attribute information of the information terminal found by the terminal search means; and determination means for determining whether or not the information terminal has content that can be processed in the information processing apparatus based on the attribute information of the information terminal acquired by the attribute information acquisition means.

In the invention according to second aspect of the invention, the information processing apparatus according to first aspect of the invention further has content collection means for collecting any desired content from the information terminal determined to have content that can be processed in the information processing apparatus by the determination means.

In the invention according to third aspect of the invention, in the information processing apparatus according to first aspect of the invention, the attribute information of the information terminal is information concerning one of content and a program that the information terminal has.

In the invention according to fourth aspect of the invention, in the information processing apparatus according to the first aspect of the invention, to determine whether or not the information terminal has content that can be processed in the information processing apparatus, the determination means extracts content information concerning the content that the information terminal has based on the attribute information of the information terminal and determines whether or not the content can be processed in the information processing apparatus based on the content information.

In the invention according to fifth aspect of the invention, in the information processing apparatus according to the first aspect of the invention, if the content is one of music data and moving picture data, the determination means determines whether or not bit rate information of the content is not more than allowable data transmission speed of a transmission channel for connecting the information terminal found by the terminal search means and the information processing apparatus.

In the invention according to sixth aspect of the invention, the information processing apparatus according to the first aspect of the invention, further comprising display means for displaying the content determined by the determination means that the content can be processed in the information processing apparatus.

In the invention according to seventh aspect of the invention, in the information processing apparatus according to the second aspect of the invention, the content collection means collects content by category based on the determination result of the determination means.

According to an eighth aspect of the invention, there is provided an information processing apparatus for processing any desired content, comprising:

terminal search means for searching for an information terminal that can communicate information with the information processing apparatus; and determination request means for requesting the information terminal found by the terminal search means to determine whether or not the information terminal has content that can be processed in the information processing apparatus.

In the invention according to a ninth aspect of the invention, the information processing apparatus according to the eighth aspect of the invention, further comprising content information collection means for collecting content information concerning the content from the information terminal requested to make the determination by the determination request means.

In the invention according to a tenth aspect of the invention, in the information processing apparatus according to the eighth aspect of the invention, the determination as to whether or not the information terminal has content that can be processed in the information processing apparatus in the determination request made by the determination request means is to determine whether or not the information terminal requested to make the determination has content, to extract content information concerning the content that the information terminal has, and to determine whether or not the content can be processed in the information processing apparatus based on the content information.

In the invention according to an eleventh aspect of the invention, in the information processing apparatus according to the eighth aspect of the invention, if the content is music data or moving picture data, the determination as to whether or not the information terminal has content that can be subjected to streaming processing in the information processing apparatus in the determination request made by the determination request means is to determine whether or not bit rate information of the content is equal to or less than allowable data transmission speed of a transmission channel for connecting the information terminal found by the terminal search means and the information processing apparatus.

In the invention according to a twelfth aspect of the invention, in the information processing apparatus according to any one of the eighth, tenth, and eleventh aspects of the invention, the determination request made by the determination request means is to transmit a determination program for causing the information terminal that can communicate information with the information processing apparatus to determine whether or not the information terminal has content that can be processed in the information processing apparatus to the information terminal.

In the invention according to a thirteenth aspect of the invention, in the information processing apparatus according to any one of the eighth, tenth, and eleventh aspects of the invention, the determination request made by the determination request means is to transmit a command for causing the information terminal that can communicate information with the information processing apparatus to determine whether or not the information terminal has content that can be processed in the information processing apparatus to the information terminal.

In the invention according to a fourteenth aspect of the invention, in the information processing apparatus according to the first aspect of the invention, the terminal search means searches for an information terminal that can communicate information with the information processing apparatus based on whether or not Bluetooth connection can be established.

In the invention according to a fifteenth aspect of the invention, in the information processing apparatus according to the eighth aspect of the invention, the terminal search means searches for an information terminal that can communicate information with the information processing apparatus based on whether or not Bluetooth connection can be established.

In the invention according to a sixteenth aspect of the invention, in the information processing apparatus according to the ninth aspect of the invention, the content information collection means collects content information by category based on the determination result of the determination means.

In the invention according to a seventeenth aspect of the invention, in the information processing apparatus according to the seventh aspect of the invention, the category is one of music data, moving picture data, still image data, and a program.

In the invention according to a eighteenth aspect of the invention, in the information processing apparatus according to the sixteenth aspect of the invention, the category is one of music data, moving picture data, still image data, and a program.

In the invention according to a nineteenth aspect of the invention, the information processing apparatus according to the ninth aspect of the invention, display means for displaying the content information collected by the content information collection means.

In the invention according to a twentieth aspect of the invention, in the information processing apparatus according to the fourth aspect of the invention, the content information is at least one of compression format information, bit rate information, sampling rate information, and extension information of the content.

In the invention according to a twenty-first aspect of the invention, in the information processing apparatus according to the ninth aspect of the invention, the content information is at least one of compression format information, bit rate information, sampling rate information, and extension information of the content.

According to the invention according to a twenty-second aspect of the invention, there is provided an information processing program for causing a computer to provide functions of an information processing apparatus, the program comprising the steps of:

searching for an information terminal that can communicate information with the computer;

acquiring attribute information of the information terminal found in the searching step; and determining whether or not the information terminal has content that can be processed in the computer based on the attribute information of the information terminal acquired in the acquiring step.

According to a twenty-third aspect of the invention, there is provided an information processing program for causing a computer to provide functions of an information processing apparatus, the program comprising the steps of:

searching for an information terminal that can communicate information with the computer;

acquiring attribute information of the information terminal found in the searching step; and determining whether or not the information terminal has content that can be processed in the computer based on the attribute information of the information terminal acquired in the acquiring step.

According to a twenty-fourth aspect of the invention, there is provided an information processing system comprising:
an information processing apparatus; and
an information terminal that can communicate information with the information processing apparatus,
wherein the information processing apparatus comprises:
terminal search means for searching for an information terminal that can communicate information with the information processing apparatus;
attribute information acquisition means for requesting attribute information of the information terminal found by the terminal search means; and
determination means for determining whether or not the information terminal has content that can be processed in the information processing apparatus based on the attribute information of the information terminal acquired by the attribute information acquisition means; and
wherein the information terminal comprises attribute information return means for returning the attribute information of the information terminal requested by the attribute information acquisition means to the information processing apparatus.

In the invention according to a twenty-fifth aspect, in the information processing system according to twenty-fourth aspect of the invention, the information processing apparatus further comprises content collection means for collecting any desired content from the information terminal determined to have content that can be processed in the information processing apparatus by the determination means.

In the invention according to a twenty-sixth aspect of the invention, in the information processing system according to the twenty-fourth aspect of the invention, to determine whether or not the information terminal has content that can be processed in the information processing apparatus, the determination means extracts content information concerning the content that the information terminal has based on the attribute information of the information terminal and determines whether or not the content can be processed in the information processing apparatus based on the content information.

In the invention according to a twenty-seventh aspect of the invention, in the information processing system according to the twenty-fourth aspect of the invention, if the content is one of music data and moving picture data, the determination means determines whether or not bit rate information of the content is not more than allowable data transmission speed of a transmission channel for connecting the information terminal found by the terminal search means and the information processing apparatus.

According to a twenty-eighth aspect of the invention, there is provided an information processing system comprising:
an information processing apparatus; and
an information terminal that can communicate information with the information processing apparatus,
wherein the information processing apparatus comprises:
terminal search means for searching for an information terminal that can communicate information with the information processing apparatus; and
determination request means for requesting the information terminal found by the terminal search means to determine whether or not the information terminal has content that can be processed in the information processing apparatus; and wherein the information terminal comprises:
content determination means for determining whether or not the information terminal has content that can be processed in the information processing apparatus in response to the determination request made by the determination request means; and
return means for returning content information of the content determined by the content determination means to the information processing apparatus.

In the invention according to a twenty-ninth aspect of the invention, in the information processing system according to the twenty-eighth aspect of the invention, the information processing apparatus further comprises content information collection means for collecting content information concerning the content from the information terminal requested to make the determination by the determination request means.

In the invention according to a thirtieth aspect of the invention, in the information processing system according to the twenty-eighth aspect of the invention, the content determination means determines whether or not the information terminal has content in response to the determination request made by the determination request means, extracts content information concerning the content that the information terminal has, and determines whether or not the content can be processed in the information processing apparatus based on the content information.

In the invention according to a thirty-first aspect of the invention, in the information processing system according to the twenty-eighth aspect of the invention, if the content is one of music data and moving picture data, the content determination means determines whether or not the information terminal has content that can be subjected to streaming processing in the information processing apparatus based on whether or not bit rate information that the content information has is not more than allowable data transmission speed of a transmission channel for connecting the information terminal and the information processing apparatus.

In the invention according to a thirty-second aspect of the invention, in the information processing system according to the twenty-eighth aspect of the invention, the determination request made by the determination request means is to transmit a determination program for causing the information terminal that can communicate information with the information processing apparatus to determine whether or not the information terminal has content that can be processed in the information processing apparatus to the information terminal; and the content determination means makes the determination as the determination program is executed.

In the invention according to a thirty-third aspect of the invention, in the information processing system according to the twenty-eighth aspect of the invention, the information terminal further comprises storage means for storing a determination program for determining whether or not the information terminal has content that can be processed in the information processing apparatus and the determination request made by the determination request means is to transmit a command for executing the determination program stored in the storage means.

According to a thirty-fourth aspect of the invention, there is provided an information processing method of an information processing system comprising the steps of:
searching for an information terminal that can communicate information with the information processing apparatus;
requesting the information terminal found in the searching step to transmit attribute information;

returning the attribute information of the information terminal requested in the requesting step to the information processing apparatus; and determining whether or not the information terminal has content that can be processed in the information processing apparatus based on the attribute information of the information terminal returned in returning step.

In the invention according to a thirty-fifth aspect of the invention, the information processing method according to the thirty-fourth aspect of the invention, further comprises the steps of collecting any desired content from the information terminal determined to have content that can be processed in the information processing apparatus in the determining step.

According to a thirty-sixth aspect of the invention, there is provided an information processing method of an information processing system comprising the steps of:

searching for an information terminal that can communicate information with the information processing apparatus;

requesting the information terminal found in the searching step to determine whether or not the information terminal has content that can be processed in the information processing apparatus; and determining whether or not the information terminal has content that can be processed in the information processing apparatus in response to the determination request made in the determination requesting step.

In the invention according to a thirty-seventh aspect of the invention, the information processing method according to the thirty-sixth aspect of the invention, further comprises the steps of collecting content information concerning the content determined in the determining step.

According to the described configuration, a search is made for an information terminal that can communicate information with the information processing apparatus, information communications are established, the attribute information of the information terminal that can communicate information with the information processing apparatus is acquired, and content which is contained in the information terminal and can be processed in the information processing apparatus is collected based on the attribute information, so that the content that can be processed in the information processing apparatus can be easily collected from the information terminal that can communicate information with the information processing apparatus.

According to the described configuration, a search is made for an information terminal that can communicate information with the information processing apparatus, information communications are established, the information terminal that can communicate information with the information processing apparatus is requested to determine whether or not the information terminal has content that can be processed in the information processing apparatus, and the content information concerning the content is collected from the information terminal requested to make the determination, so that the content that can be processed in the information processing apparatus can be easily collected from the information terminal that can communicate information with the information processing apparatus.

According to the described configuration, the content information collected from a plurality of information terminals is displayed on the display means and the user views the display means and performs operation, so that the user can perform operation without considering which of the information terminals the content is stored in.

Further, according to the described configuration, the content that can be processed in the information processing apparatus and can be subjected to streaming processing in real time can be collected, so that the storage capacity of the information processing apparatus can be lessened.

BRIEF DESCRIPTION OF THE DRAWINGS

In the accompanying drawings:

FIG. 6 is a schematic representation to show a generated music list;

DETAILED DESCRIPTION OF THE PREFERRED EMBODIMENTS

Embodiments of an information processing system, an information processing method of the information processing system, and an information processing apparatus according to the invention will be discussed in detail with reference to the accompanying drawings in the order of [First embodiment], [Second embodiment], [Modified example of second embodiment]. In the embodiments, the information processing system, the information processing method of the information processing system, and the information processing apparatus according to the invention will be discussed in detail; an information processing program according to the invention is an information processing program to cause a computer to function as information processing apparatus and therefore the description of the information processing program is contained in the description of the information processing apparatus to follow.

First Embodiment

Figure 1:
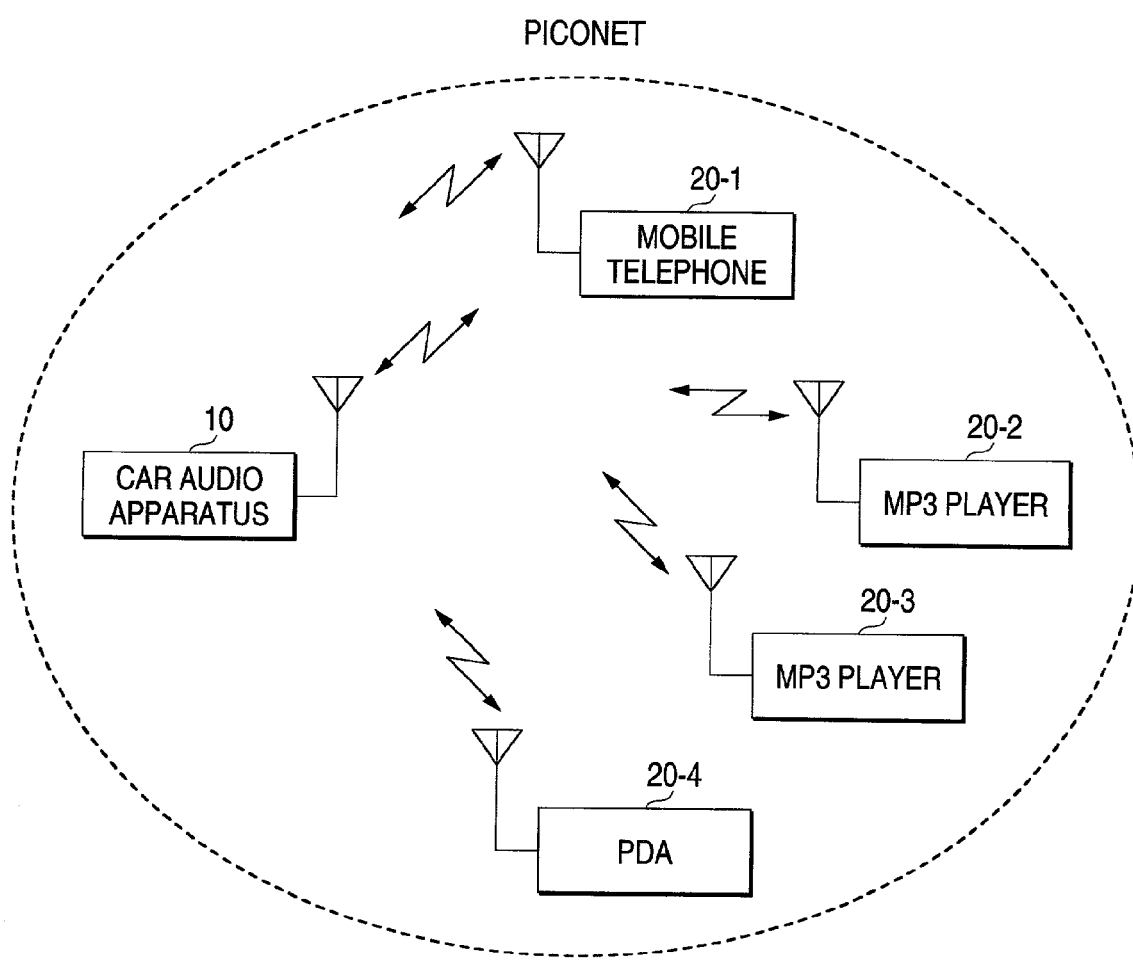
FIG. 1 is a block diagram to show the schematic configuration of an information processing system according to a first embodiment of the invention.
Figure 2:
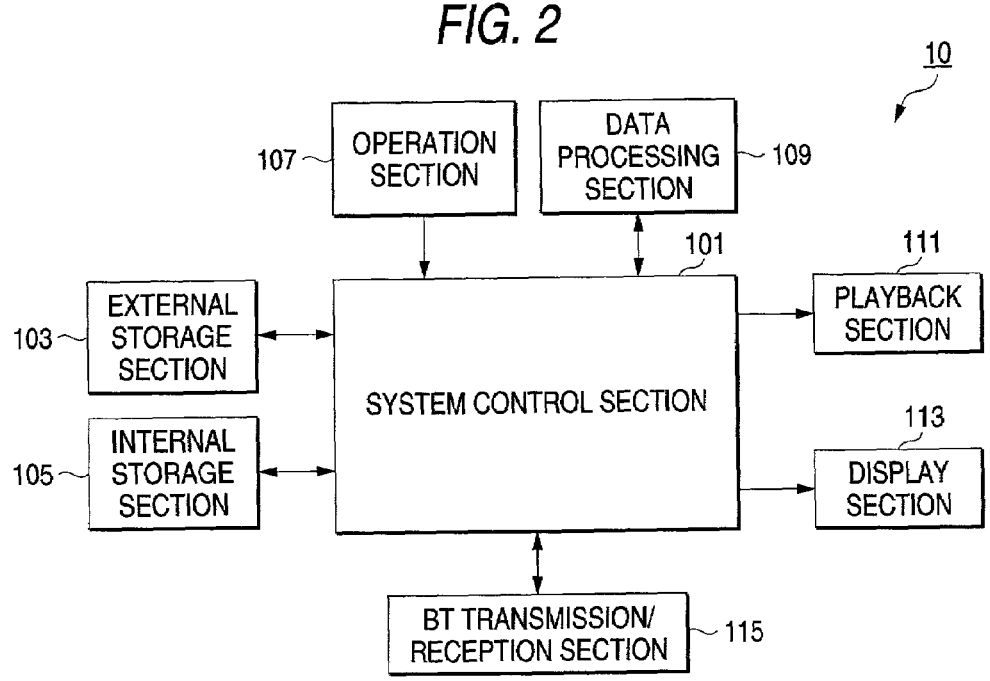
FIG. 2 is a block diagram to show the detailed configuration of a car audio apparatus.
Figure 3:
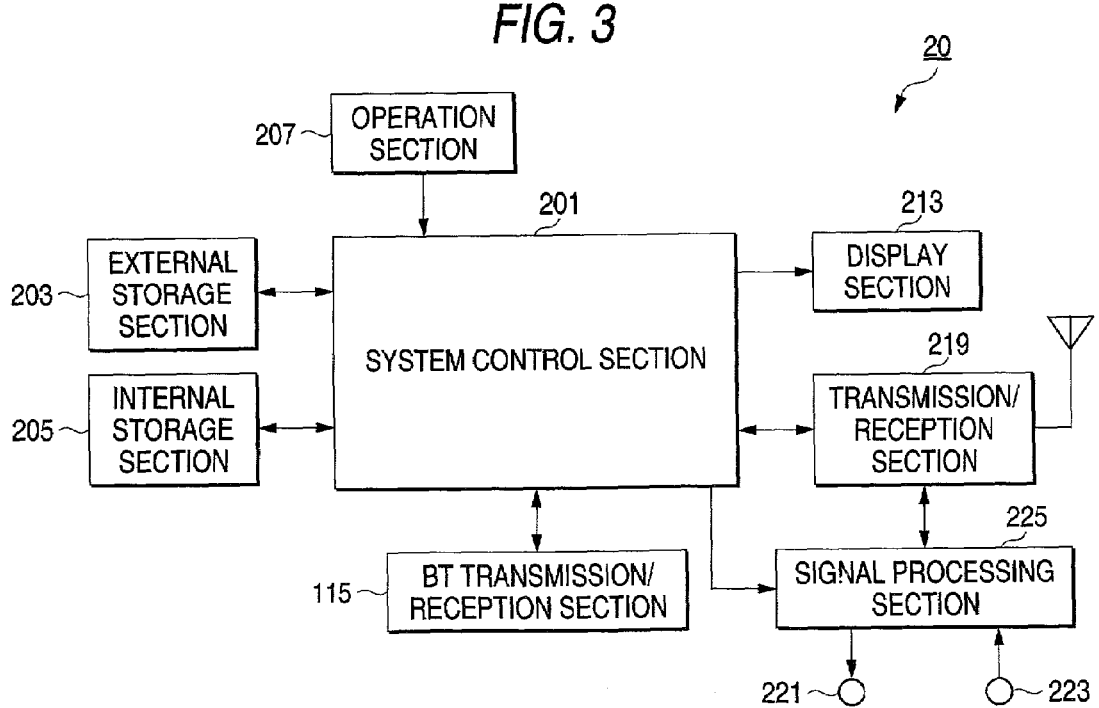
FIG. 3 is a block diagram to show the configuration of an information terminal.
Figure 4:
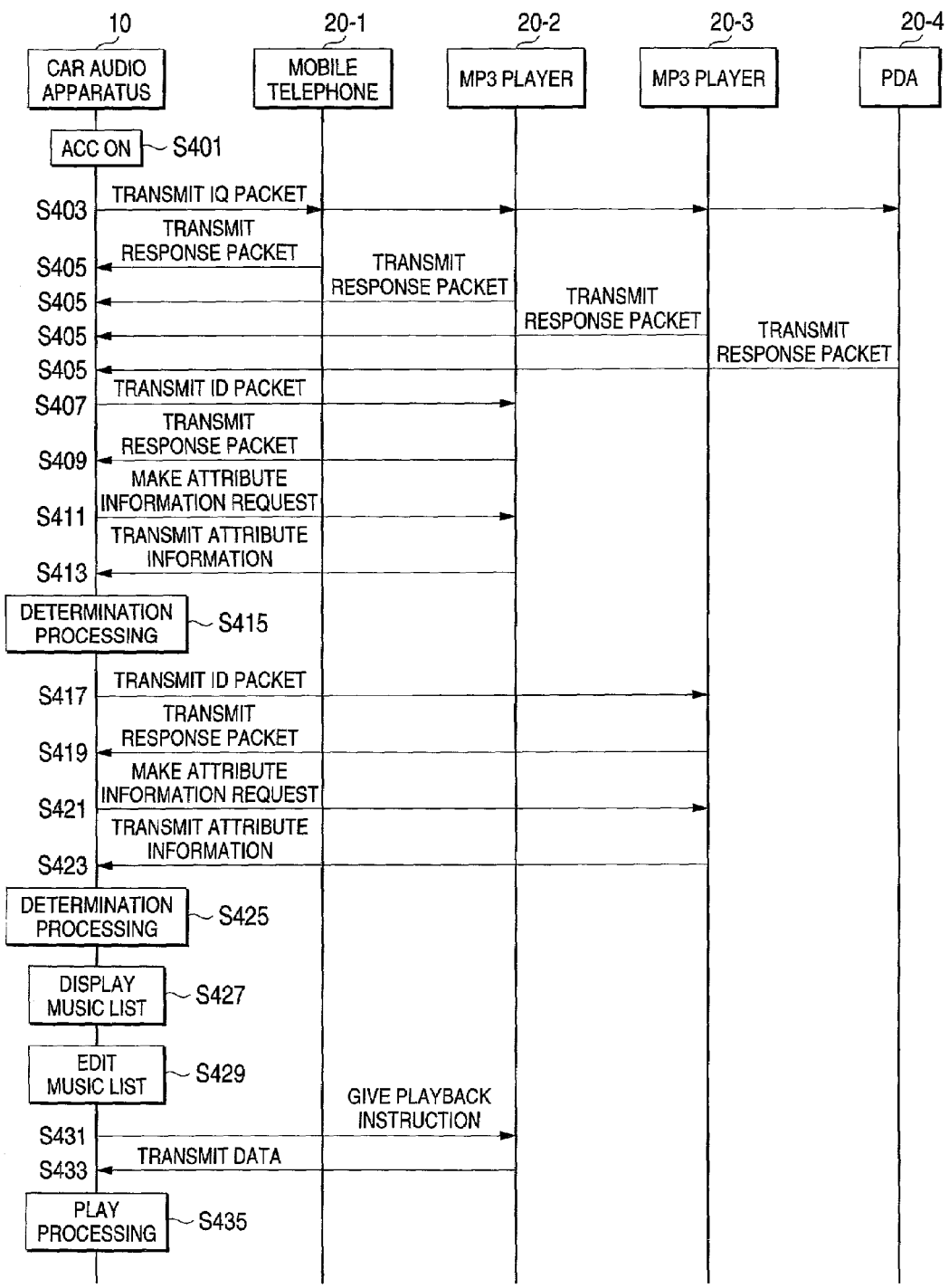
FIG. 4 is a sequence chart to show processing in the information processing system according to the first embodiment of the invention.

FIG. 1 is a block diagram to show the schematic configuration of an information processing system according to a first embodiment of the invention. FIGS. 2 and 3 are block diagrams to show the detailed configurations of components making up the information processing system of the embodiment. Further, FIG. 4 is a sequence chart to show processing in the information processing system according to the embodiment.

To begin with, the general configuration and the operation of the information processing system according to the embodiment will be discussed with reference to FIG. 1. FIG. 1 is a block diagram to show the information processing system wherein machines in a Bluetooth radio communication system are connected so that they can communicate with each other. The information processing system shown in the figure has a car audio apparatus 10 as an information processing apparatus used as a master and a mobile telephone 20-1, an MP3 (MPEG-1 Audio Layer-3) player 20-2, an MP3 player 20-3, and a PDA (Personal Digital Assistant) 20-4 as information terminals used as slaves.

A Bluetooth module (BT module) (not shown) is installed in each of the machines and the machines each in which the BT module is installed (BT machines) make up a network (piconet) in which the BT modules enable the BT machines to communicate with each other. The information processing system shown in FIG. 1 assumes that a plurality of users having information terminals 20 such as the mobile telephone 20-1, the MP3 player 20-2, the MP3 player 20-3, and the PDA 20-4 in which the BT modules are installed ride together in a vehicle having the car audio apparatus 10 in which the BT module is installed, for example.

The operation of the information processing system shown in FIG. 1 is as follows: To begin with, when the car audio apparatus 10 as the master forms a piconet together with the information terminals 20 existing in the periphery of the car audio apparatus 10, the car audio apparatus 10 acquires attribute information from the information terminals 20 (slave machines) and determines whether or not each information terminal 20 has a music file that can be played in the self-terminal (car audio apparatus 10) based on the attribute information, and then prepares a music list of the music files that can be played in the self-terminal (car audio apparatus 10).

In FIG. 1, by way of example, the four information terminals 20 of the mobile telephone 20-1, the MP3 player 20-2, the MP3 player 20-3, and the PDA 20-4 as the slaves are drawn in the piconet. Generally, the master machine connect to a maximum of seven slave machines in one piconet and further one BT machine can serve as both the master or a slave in one piconet and maser/slave in another piconet, so that the machines belonging to a plurality of piconets serve as relays, whereby the piconets can be connected.

Here, a supplementary description about the Bluetooth radio communication system (BT radio communication system) is made. The BT radio communication system connects the BT machines within the range of a radius of about 10 m (practical use range) by a radio communication link using a feeble radio wave of a 2.4-GHz band for transmitting signals of data, voice, etc., by radio. In the BT radio communication system, point-to-point signal transmission may be executed between the BT machines in which the BT modules are installed; generally a plurality of BT machines often construct one network for transmitting signals in the network. In the BT radio communication system, such a point-to-multipoint (one-to-n) signal transmission network is called piconet. The piconet is a network in which a machine group consisting of one master machine and up to seven slave machines uses a common communication channel. The master machine controls BT radio communication link forming and other communication procedures in the piconet and each slave machine can transmit and receive a signal to and from only the master machine.

Next, the detailed configurations of the machines making up the information processing system of the first embodiment will be discussed with reference to FIGS. 2 and 3. FIG. 2 is a block diagram to show the detailed configurations of the car audio apparatus 10. In the figure, the car audio apparatus 10 comprises a system control section 101 as terminal search means, attribute information acquisition means, determination means, and content collection means, an external storage section 103, an internal storage section 105, an operation section 107, a data processing section 109, a playback section 111, a display section 113 as display means, and a BT transmission/reception section 115.

The system control section 101 is implemented as, for example, a CPU, a DSP (digital signal processor), etc., for controlling the components of the car audio apparatus 10. The operation section 107 is implemented as a remote controller, a console panel, etc., provided with various input buttons for accepting user's operation and inputting various pieces of data and various commands. The BT transmission/reception section 115 transmits and receives a signal to and from any other BT machine through an antenna, an internal antenna (not shown), etc., using a transmission system using a feeble radio wave of a 2.4-GHz band requiring no license; it consists mainly of a general-purpose BT module.

A brief description of the configuration of the BT module is as follows: The BT module is made up of five functional blocks of a high-frequency processing section connected to an antenna, a hop frequency calculation section for calculating frequency hopping, a base band signal processing section for controlling transmission packet and radio communication link and performing processing of transmission signal error correction, security control in communication procedure, etc., a CPU section for controlling functions, and a storage section for storing various pieces of data.

The external storage section 103 is implemented as, for example, a CD-ROM drive, an MD drive, a DVD-ROM drive, or the like and a record medium such as CD-ROM, MD, or DVD-ROM stored in the drive, etc., hard disk (HDD), or a record medium such as portable semiconductor memory for reading record information (music data, etc.,) as content from the record medium. The internal storage section 105 is implemented as, for example, volatile and nonvolatile semiconductor memories (RAM, ROM, EEPROM, flash memory), etc., and various pieces of data that a general car audio apparatus has are stored in the semiconductor memories.

The data processing section 109 compresses (encodes) music data received through the BT transmission/reception section 115, music data read from the external storage section 103, etc., in the format of MP3 defined in MPEG1, AAC (Advanced Audio Coding) defined in MPEG2, etc., for example, and decompresses (decodes) the compressed music data. The playback section 111 converts the music data read from the external storage section 103 into sound for output, and is implemented as, for example, a D/A converter for converting the music data into an analog signal, an amplifier for amplifying the analog signal, a loudspeaker for converting the amplified analog signal into sound and outputting the sound, and the like. Further, the display section 113 is implemented as, for example, a display such as a liquid crystal panel for listing music data that can be played in the car audio apparatus 10.

Next, FIG. 3 is a block diagram to show the configuration of the information terminal 20 shown in FIG. 1. The mobile telephone 20-1, the MP3 player 20-2, the MP3 player 20-3, and the PDA 20-4 have each a similar basic configuration and therefore will be discussed as the information terminal 20. Blocks having functions identical with those previously described with reference to FIG. 2 are denoted by the same reference numerals in FIG. 3 and will not be discussed again. The information terminal 20 comprises a system control section 201, an external storage section 203, an internal storage section 205, an operation section 207, a display section 213, a signal processing section 225 for processing a signal input from a microphone 223 and a signal output to a loudspeaker 221, a transmission/reception section 219, and a BT transmission/reception section 115 as attribute information return means. If the information terminal 20 is the MP3 player 20-2 or 20-3, it further comprises a data processing section 209 for compressing and decompressing data (not shown) and a playback section 211 for converting digital data into sound for output (not shown).

The system control section 201 is implemented as, for example, a CPU, etc., for controlling the components of the information terminal 20. If the information terminal 20 is, for example, a portable personal computer, etc., the external storage section 203 is implemented as a record medium such as hard disk, portable semiconductor memory, or magnetic disk. If the information terminal 20 is, for example, the mobile telephone, the MP3 player, or the PDA, the external storage section 203 is implemented as portable semiconductor memory. Music data is stored on these record media and is read by a mechanism for reading the corresponding record medium based on a command from the system control section 201. The internal storage section 205 is implemented as, for example, volatile and nonvolatile semiconductor memories (RAM, ROM, EEPROM, flash memory), etc., and various pieces of data that a general information terminal 20 has are stored in the semiconductor memories.

The operation section 207 is implemented as, for example, a keyboard, a ten-key numerical pad, a pointing device, a pen input section, etc., for accepting user's operation and inputting various pieces of data. The display section 213 is implemented as, for example, a liquid crystal panel for displaying various pieces of data stored in the external storage section 203 and the internal storage section 205 and also displaying data received through the transmission/reception section 219. The transmission/reception section 219 receives a radio signal from the outside through an antenna and demodulates the signal and modulates data to be transmitted to the outside and transmits the data.

Figure 5:
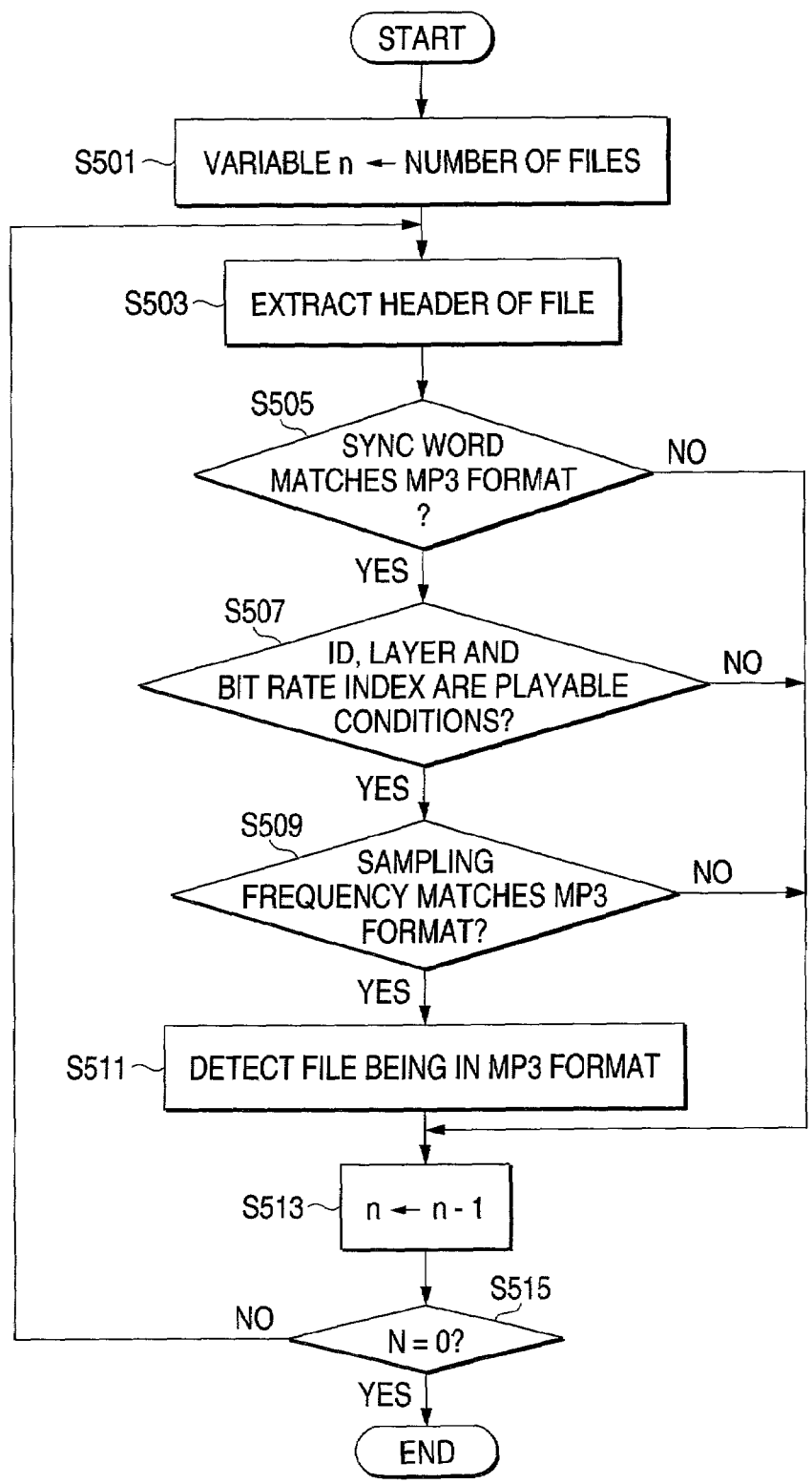
FIG. 5 is a flowchart to describe music file determination processing.

Next, processing in the information processing system of the embodiment will be discussed in detail with reference to FIGS. 4, 5, and 6. FIG. 4 is a sequence chart to show file processing in the information processing system of the first embodiment. FIG. 5 is a flowchart to describe file determination processing for determining the file. FIG. 6 is a schematic representation to show a music list prepared based on header information of music files.

To being with, in the car audio apparatus 10, when the user turns on an ACC (Accessory) switch of the vehicle and turns on power (step S401), the car audio apparatus 10 performs INQUIRY processing of inquiring whether or not a communicable terminal (BT machine) exists in the periphery of the car audio apparatus 10, thereby searching for a terminal. In this INQUIRY processing, first the car audio apparatus 10 as the master broadcasts an IQ packet (broadcast packet) to the periphery (step S403) and each information terminal 20 receiving the packet returns a response packet (Inquiry Response) (step S405). The response packet contains the clock value, the BT device address, machine type information (Class of device), and the like of the information terminal 20 returning the response packet. It is assumed that each information terminal 20 is powered on and basically is in a state in which it can respond to an inquiry from the master. At step S401, the ACC switch of the vehicle is turned on and the power is turned on, whereby constructing a piconet in the BT radio communication system is started. However, constructing a piconet may be started when the user turns on the power of the car audio apparatus 10 independently of turning on the ACC switch of the vehicle.

Next, the car audio apparatus 10 performs PAGING processing for any desired machine based on the machine type information obtained in the INQUIRY processing. In the embodiment, the purpose is to collect music files that can be played in the car audio apparatus 10 and thus the desired machine is an audio machine having a high possibility of having a music file. Thus, the car audio apparatus 10 recognizes the MP3 player 20-2 and the MP3 player 20-3 as audio machines from the machine type information obtained in the INQUIRY processing and performs PAGING processing for the MP3 player 20-2 and the MP3 player 20-3. The PAGING processing is to synchronize frequency hopping pattern and/or clocl for the car audio apparatus 10 and specific BT machines to make up a piconet.

To execute the PAGING processing, the car audio apparatus 10 as the master continuously transmits an ID packet containing the BT device address, etc., of the MP3 player 20-2 to the MP3 player 20-2 (step S407) and the MP3 player 20-2 transmits a response packet to the car audio apparatus 10 as a response (step S409).

Next, the car audio apparatus 10 transmits a request signal to acquire more detailed machine attribute information to the MP3 player 20-2 (step S411) and the MP3 player 20-2 transmits attribute information as a response (step S413). This attribute information is the headers of the files that the machine has, the file extensions, etc.

Next, the car audio apparatus 10 performs determination processing of determining whether or not the MP3 player 20-2 has a music file that can be played in the car audio apparatus 10 based on the attribute information of the MP3 player 20-2 obtained at step S413 (the headers of the files that the MP3 player 20-2 has) (step S415).

Here, the determination processing at step S415 will be discussed in detail with reference to FIG. 5. For example, if the data processing section 109 of the car audio apparatus 10 can decode only music data in the MP3 format, the car audio apparatus 10 can only play music files in the MP3 format (cannot decode any file in a WMA (Windows Media Audio) format or in an ATRAC3 (Adaptive Transform Acoustic Coding 3) format) and therefore each music file in the MP3 format is determined. FIG. 5 is a flowchart to illustrate determination processing of a music file in the MP3 format.

To begin with, the number of the headers of the files that the MP3 player 20-2 has, obtained at step S413 is set to variable n (step S501). Next, one of the headers of files, which is set, is extracted (step S503). A sync word is extracted from the header of the music file and whether the 12-bit sync word all matches the MP3 format is checked (step S505). If the sync word is all 1, the process proceeds to step S507.

A one-bit ID, a two-bit layer, and a four-bit bit rate index are extracted from the file header and a check is made to ensure that the bit rate determined from the combination of MPEG audio version information indicated by the ID, layer information indicating the layer (layer 1, 2, or 3), and the bit rate index is equal to or less than the allowable data transmission speed of the BT radio communication system (step S507). Next, a check is made to ensure that the sampling rate is the MP3 format (step S509). When the sampling rate is checked for the MP3 format, the file being an MP3 file is detected (step S511) and the setup variable n is decremented by one (step S513). Next, termination processing is performed (step S515) and when the variable n is 0, the determination processing is terminated. On the other hand, when the variable is not 0 at step S515, control returns to step S503 and the processing is continued.

That is, the processing of steps 503 to S511 is performed for the headers of all files set at step S501. If the determination at step S505, S507, or S509 returns NO, the process proceeds to step S513 and the setup variable n is decremented by one and another file header is processed. If the setup number of files is 0 at step S501, the determination processing is terminated. If the car audio apparatus 10 performs streaming processing of the music file, the bit rate information of the music file needs to be equal to or less than the allowable data transmission speed in the BT radio communication system and therefore the bit rate is checked at step S507. However, if the car audio apparatus 10 does not perform streaming processing and plays the music file, a check is only made to ensure that the bit rate is the MP3 format.

Referring again to FIG. 4, like the PAGING processing (steps S407 to S413) and the file determination processing (step S415) for the MP3 player 20-2, PAGING processing and file determination processing shown at steps S417 to S425 are performed for the MP3 player 20-3 according to the machine type information obtained at step S405.

Next, information representing the title of the music piece, the artist name of the music piece, the play time of the music piece, the compression format of the music file, the storage location of the music file in the MP3 player 20-2 or 20-3, etc., is taken out from the header of each of the music files (music data) determined to be playable the car audio apparatus 10, and is displayed on the display section 113 in a list format shown in FIG. 6 (step S427).

FIG. 6 is a schematic representation to illustrate a music list displayed on the display section 113 of the car audio apparatus 10. In the figure, a music list 600 consists of the track number, the title, the artist name, the play time, and the compression format (compressed file format) of each music file.

Next, the user edits the music list displayed on the display section 113 of the car audio apparatus 10 through the operation section 107 in such a manner that the user edits the order of the music pieces, deletes unnecessary music pieces, or performs narrow retrieval processing in a favorite music category (step S429). When a user's playback instruction of the music piece in the music list edited at step S429 is accepted through the operation section 107, the playback instruction is transmitted to the MP3 player 20-2 having the music file corresponding to the given playback instruction (S431), the MP3 player 20-2 storing the music file transmits the music file corresponding to the given playback instruction through the BT radio communication system (step S433), and the car audio apparatus 10 performs streaming of encoding the received music file in real time and performing play processing (step S435).

Thus, although each music file displayed in the music list shown in FIG. 6 is stored in the MP3 player 20-2 or the MP3 player 20-3, the user can play the music file without considering which machine of the MP3 players 20-2 and 20-3 the music data is stored in by performing operation based on the music list.

After the music list is edited at step S429, the music pieces in the music list may be collected from the MP3 player 20-2, the MP3 player 20-3, etc., storing the music pieces. For example, all music pieces in the edited music list can be copied into the car audio apparatus 10 through the BT radio communication system from the information terminals 20 storing the music pieces and each music piece stored in the car audio apparatus 10 can be played according to a user's playback instruction.

In the embodiment, the PAGING processing (steps S407 to S413 and steps S417 to S423) is performed only for the audio machines determined in the INQUIRY processing shown at steps S403 and S405 in FIG. 4 (MP3 players 20-2 and 20-3). However, there is a possibility that the information terminals 20 which are not audio machines (the mobile telephone 20-1 and the PDA 20-4 shown in FIG. 1), etc., may store a music file and thus if one machine is not determined to be an audio machine based on the machine type information obtained in the INQUIRY processing, all BT machines may be requested to return attribute information (file headers, etc.,) by the PAGING processing and the master machine may determine the returned attribute information as requested.

Since the machine determined to be an audio machine based on the machine type information obtained in the INQUIRY processing has a higher possibility of storing a music file than the mobile telephone 20-1, the PDA 20-4, etc., not determined to be an audio machine, the PAGING processing may be performed for the machines determined to be audio machines taking priority over those not determined to be audio machines.

Further, the information terminal 20 not determined to be an audio machine based on the machine type information obtained in the INQUIRY processing (the mobile telephone 20-1, the PDA 20-4, etc.,) has a low possibility of storing a music file and therefore the information terminal 20 maybe requested to return only the extension of each file stored in the information terminal 20 as the attribute information. Thus, the contents of the attribute information requested in the PAGING processing are changed in response to the machine type information obtained in the INQUIRY processing, whereby the communication time and the processing time can be shortened.

As described above, according to the information processing system, the information processing apparatus, and the information processing method of the first embodiment according to the invention, the car audio apparatus 10 forms a piconet together with the information terminals 20 that can communicate information with the car audio apparatus 10 using the BT radio communication system so that information can be communicated in the piconet, and the car audio apparatus 10 acquires the attribute information of each information terminal 20 that can communicate information with the car audio apparatus 10, and determines and collects the playable music files, so that the car audio apparatus 10 can easily collect the playable music files from the information terminals 20 that can communicate information with the car audio apparatus 10.

The content collected from the information terminals 20 that can communicate information with the car audio apparatus 10 is displayed on the display section 113 of the car audio apparatus 10 and the user views the display section 113 and performs operation, so that the user can perform operation without considering which of the information terminals 20 the music file is stored in.

Further, the music files that can be played in the car audio apparatus 10 and can be subjected to streaming play processing in real time can be collected from other machines than the car audio apparatus 10, so that the storage capacity of the external storage section 103 of the information processing apparatus can be lessened and consequently the space of the car audio apparatus 10 can be saved.

Second Embodiment

Next, a second embodiment of the invention will be discussed. An information processing system according to the embodiment has a similar configuration to that previously described with reference to FIG. 1 in the first embodiment. In the information processing system of the second embodiment, after a piconet is formed, a car audio apparatus 10 as the master transmits a determination program to information terminals 20 (mobile telephone 20-1, MP3 player 20-2, MP3 player 20-3, and PDA 20-4) existing in the communicable range in a BT radio communication system, and each information terminal executes the received determination program, determines whether or not a music file (music data) that can be played in the car audio apparatus 10 is stored in a storage section of the terminal, and transmits attachment information to the music file to the car audio apparatus 10. The car audio apparatus 10 prepares a music list of the music files that can be played in the car audio apparatus 10 based on the attachment information to the received music files.

The configurations of the components making up the information processing system of the embodiment are similar to those of the car audio apparatus 10 shown in FIG. 2 and the information terminal 20 shown in FIG. 3 previously described in the first embodiment except that a determination program is stored in an internal storage section 105 of the car audio apparatus 10. The car audio apparatus 10 comprises a system control section 101 as terminal search means, determination request means, and content information collection means, an external storage section 103, an internal storage section 105, an operation section 107, a data processing section 109, a playback section 111, a display section 113 as display means, and a BT transmission/reception section 115.

The information terminal 20 comprises a system control section 201 as content determination means, an external storage section 203, an internal storage section 205, an operation section 207, a display section 213, a signal processing section 225 for processing a signal input from a microphone 223 and a signal output to a loudspeaker 221, a transmission/reception section 219, and a BT transmission/reception section 115 as return means.

The determination program causes the information terminal 20 to perform determination processing of determining whether or not a music file that can be played in the car audio apparatus 10 is stored in the information terminal 20 and upon detection of a playable music file in the car audio apparatus 10, causes the information terminal 20 to transmit content information to the car audio apparatus 10 as the determination result.

Figure 7:
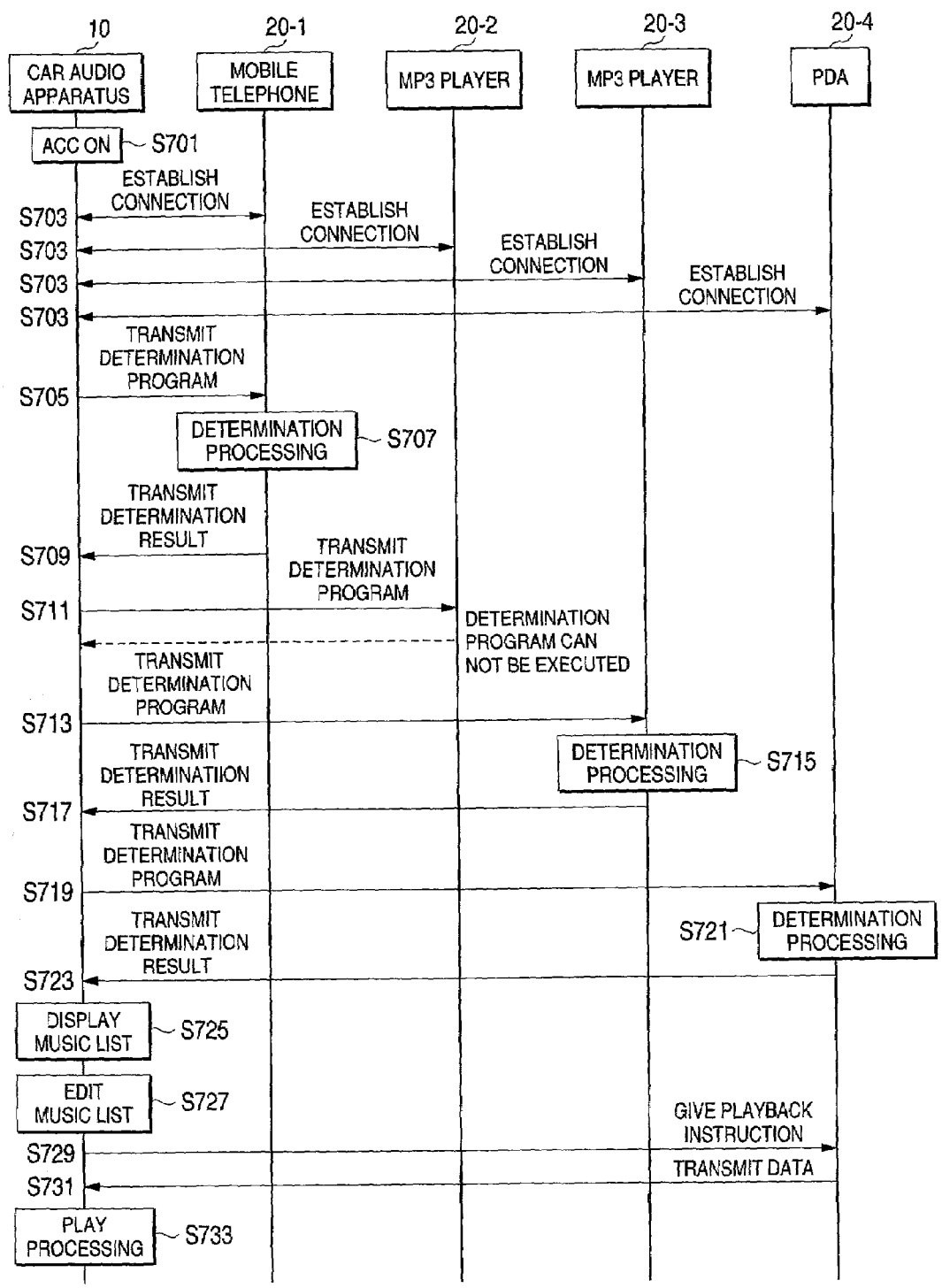
FIG. 7 is a sequence chart to show music file processing in an information processing system according to a second embodiment of the invention.

Next, processing in the information processing system of the embodiment will be discussed in detail with reference to FIG. 7. FIG. 7 is a sequence chart to show music file processing in the information processing system of the second embodiment. In the figure, to being with, in the car audio apparatus 10, when the user turns on an ACC switch of the vehicle and turns on power (step S701), the car audio apparatus 10 performs INQUIRY processing to search for BT machines in the surroundings of the car audio apparatus 10 and PAGING processing to establish connection in synchronization like the processing at steps S403 to S413 previously described with reference to FIG. 4 in the first embodiment, and forms a piconet together with the mobile telephone 20-1, the MP3 player 20-2, the MP3 player 20-3, and the PDA 20-4 (step S703).

Next, the car audio apparatus 10 transmits the determination program for determining whether or not each information terminal 20 has a music file that can be played in the car audio apparatus 10 to the mobile telephone 20-1, and requests the mobile telephone 20-1 to make determination (step S705). Upon reception of the determination program transmitted from the car audio apparatus 10, the mobile telephone 20-1 executes the determination program to perform determination processing of determining whether or not a music file that can be played in the car audio apparatus 10 is stored in the mobile telephone 20-1 (step S707).

When 10 music files are detected in the determination processing at step S707, the mobile telephone 20-1 transmits content information representing the titles of the music pieces, the artist names of the music pieces, the play times of the music pieces, the compression formats of the music files, the storage locations of the music files in the mobile telephone 20-1, and the like to the car audio apparatus 10 as the determination result (step S709). The content information is taken out from the headers of the music files or if the content information is not contained in the header of the music file, data containing the content information is created from the music file and is transmitted. The car audio apparatus 10 collects and stores the content information transmitted from the mobile telephone 20-1.

The determination processing at step S707 is similar to the determination processing previously described with reference to FIG. 5 in the first embodiment. In the first embodiment, the determination processing of the file headers received as the attribute information is previously described with reference to FIG. 5; in the second embodiment, the headers of the files stored in the information terminal 20 are determined. Accordingly, for example, if the data processing section 109 of the car audio apparatus 10 can decode only music data in the MP3 format, the car audio apparatus 10 can only play music files in the MP3 format and therefore the music files in the MP3 format are determined.

If the file is determined to be an unplayable file in the car audio apparatus 10 in the determination processing at step S707, the car audio apparatus 10 may be informed of the cause of unplayability, such as difference in compression codec type. The headers of the music files are extracted and the files in the MP3 format are detected. However, if the total number of files and the total number of music files are large or if the information terminal requested to make a determination has a low processing capability, whether each file is music data and is in a compression format to enable the file to be played in a car audio machine may be determined based on the extension of the file and when music list preparation processing at step S729 described later or after a predetermined time, a correction may be made based on the header of the music file determined.

Next, the car audio apparatus 10 transmits the determination program to the MP3 player 20-2 (step S711) as at step S705. It is assumed that even if the MP3 player 20-2 receives the determination program transmitted from the car audio apparatus 10 at step S711, the MP3 player 20-2 cannot execute the determination program because the MP3 player 20-2 is in an environment in which the determination program cannot be executed or the MP3 player 20-2 is in a busy state of playing a music piece, for example. Thus, the determination result of the determination processing of the determination program is not transmitted to the car audio apparatus 10.

The car audio apparatus 10 does not receive the determination result from the MP3 player 20-2 within a predetermined time and thus handles the event as a timeout and makes a transition to the next processing. The car audio apparatus 10 may transmit the determination program a predetermined number of times for a predetermined time to the timeout.

Next, as in processing at steps S705 to S709, the car audio apparatus 10 transmits the determination program to the MP3 player 20-3 and the MP3 player 20-3 executes the determination program and transmits the determination result at steps S713 to S717 and the car audio apparatus 10 transmits the determination program to the PDA 20-4 and the PDA 20-4 executes the determination program and transmits the determination result at steps S719 to S723. Next, the car audio apparatus 10 displays the determination results received at steps S709, S717, and S723 on the display section 113 in the list format shown in FIG. 6 (step S725).

Next, the user edits the music list displayed on the display section 213 of the car audio apparatus 10 through the operation section 107 in such a manner that the user edits the order of the music pieces, deletes unnecessary music pieces, or performs narrow retrieval processing in a favorite music category (step S727). When a playback instruction of the music piece in the music list edited at step S727 is accepted through the operation section 207 from the user, the playback instruction is transmitted to the information terminal (for example, the PDA 20-4) having the music piece corresponding to the given playback instruction (S729), the PDA 20-4 transmits the music file corresponding to the given playback instruction through the BT radio communication system (step S731), and the car audio apparatus 10 performs streaming of encoding the received music data in real time and performing play processing (step S733).

After the music list is edited at step S727, the music pieces in the music list may be collected from the mobile telephone 20-1, the MP3 player 20-3, the PDA 20-4, etc., storing the music pieces. For example, all music pieces in the edited music list can be copied into the car audio apparatus 10 through the BT radio communication system from the information terminals 20 storing the music pieces and each music piece stored in the car audio apparatus 10 can be played according to a user's playback instruction.

The determination program is transmitted in order at steps S705, S711, S713, and S719. However, the determination program need not necessarily be transmitted in this order. For example, the determination program may be transmitted preferentially to the MP3 player 20-2, 20-3 having a high possibility of having a music file based on the machine type information described in the first embodiment, obtained in the INQUIRY processing to establish connection at step S703. The determination program may be transmitted to the mobile telephone 20-1, the MP3 player 20-2, the MP3 player 20-3, and the PDA 20-4 at the same time.

As described above, according to the information processing system, the information processing apparatus, and the information processing method of the second embodiment according to the invention, the car audio apparatus 10 forms a piconet together with the information terminals 20 that can communicate information with the car audio apparatus 10 using the BT radio communication system so that information can be communicated in the piconet, and the car audio apparatus 10 transmits the determination program that can determine whether or not each information terminal 20 that can communicate information with the car audio apparatus 10 has content that can be played in the car audio apparatus 10 to the information terminal 20, which then executes the received determination program to determine whether or not the information terminal 20 has a music file that can be played in the car audio apparatus 10, and transmits the attachment information to the music file to the car audio apparatus 10, so that the car audio apparatus 10 can easily collect the playable music files from the information terminals 20 that can communicate information with the car audio apparatus 10.

The attachment information to the music files collected from the information terminals 20 is displayed on the display section 113 of the car audio apparatus 10 and the user views the display section 113 and performs operation, so that the user can perform operation without considering which of the information terminals 20 the music file is stored in.

Further, the music files that can be played in the car audio apparatus 10 and can be subjected to streaming play processing in real time can be collected from other machines than the car audio apparatus 10, so that the storage capacity of the external storage section 103 of the information processing apparatus can be lessened and consequently the space of the car audio apparatus 10 can be saved.

Modification of Second Embodiment

Next, a modification of the second embodiment of the invention will be discussed. An information processing system according to the modification has a similar configuration to that of the information processing system previously described with reference to FIG. 1. In the information processing system of the modification, a determination program is stored in each of a mobile telephone 20-1, an MP3 player 20-2, an MP3 player 20-3, and a PDA 20-4 and when a car audio apparatus 10 transmits a determination command to execute the determination program stored in information terminals 20 (in this embodiment, mobile telephone 20-1, MP3 player 20-3, and PDA 20-4) existing in the communicable range in a BT radio communication system to the information terminals 20, each of the mobile telephone 201, the MP3 player 20-2, the MP3 player 20-3, and the PDA 20-4 executes the determination program for determining a music file that can be played in the car audio apparatus 10 from the files stored in a storage section of the terminal and transmitting attachment information to the music file to the car audio apparatus 10 based on the received determination command. The car audio apparatus 10 prepares a music list of the music files that can be played in the car audio apparatus 10 based on the attachment information to the received music files.

The configurations of the components making up the information processing system of the modification are similar to those of the car audio apparatus 10 (see FIG. 2) and the information terminal 20 (see FIG. 3) previously described in the second embodiment except that the determination program is not stored in an internal storage section 105 of the car audio apparatus 10 and is stored in internal storage section 205 of the information terminal 20. When the determination command is received from the car audio apparatus 10, the determination program performs determination processing of determining whether or not a music file that can be played in the car audio apparatus 10 is stored in the information terminal 20 and upon detection of a playable music file in the car audio apparatus 10, transmits the attachment information to the music file to the car audio apparatus 10 as the determination result.

Figure 8:
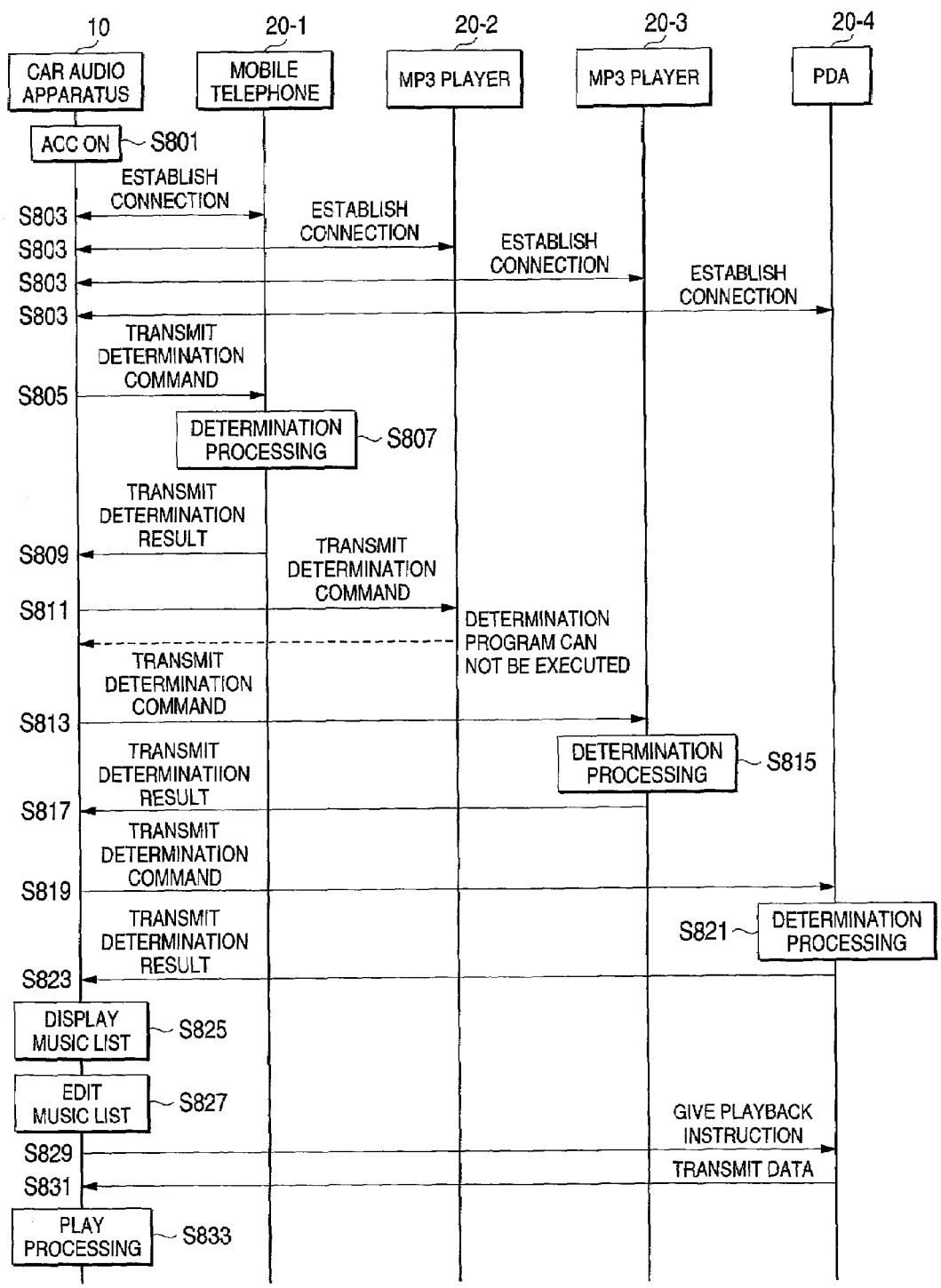
FIG. 8 is a sequence chart to show music file processing in an information processing system according to a modification of the second embodiment of the invention.
Figure 9:
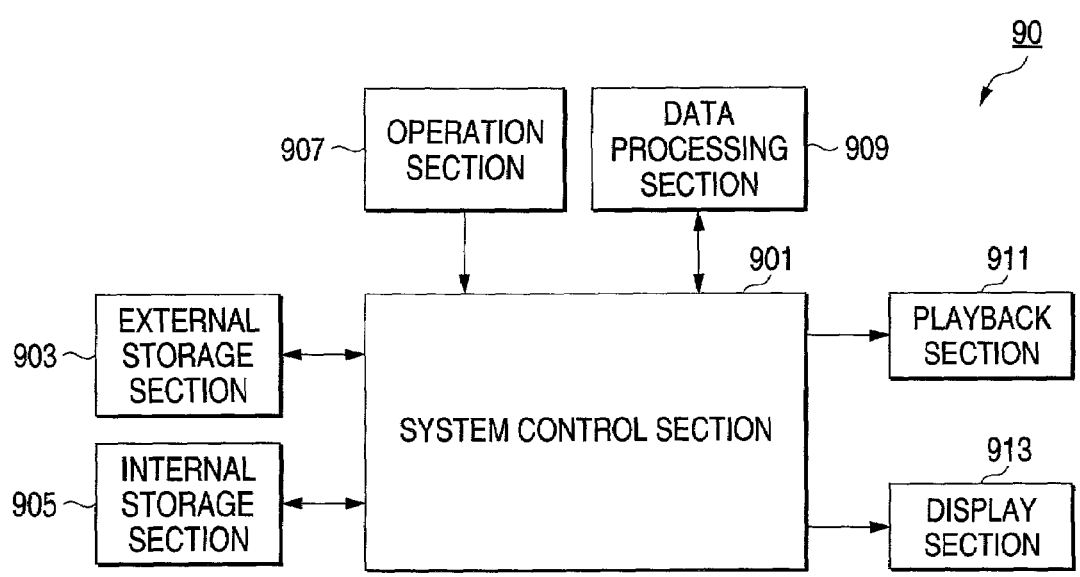
FIG. 9 is a block diagram to show a car audio apparatus in a related art.

Next, music file processing in the information processing system of the modification will be discussed with reference to FIG. 8. FIG. 8 is a sequence chart to show music file processing in the information processing system of the modification. In the figure, to being with, in the car audio apparatus 10, when the user turns on an ACC switch of the vehicle and turns on power (step S801), the car audio apparatus 10 performs INQUIRY processing to search for BT machines in the surroundings of the car audio apparatus 10 and PAGING processing to establish connection in synchronization like the processing at steps S403 to S413 previously described with reference to FIG. 4 in the first embodiment, and forms a piconet together with the mobile telephone 20-1, the MP3 player 20-2, the MP3 player 20-3, and the PDA 20-4 (step S803). Next, the car audio apparatus 10 transmits the determination command for executing the determination program stored in each information terminal 20 to the mobile telephone 20-1 (step S805).

Upon reception of the determination command transmitted from the car audio apparatus 10 at step S805, the mobile telephone 20-1 executes the determination program stored therein to perform determination processing of determining whether or not a music file that can be played in the car audio apparatus 10 is stored in the mobile telephone 20-1 (step S807). When five music files are determined in the determination processing at step S807, the mobile telephone 20-1 transmits music file attachment information representing the titles of the music pieces, the artist names of the music pieces, the play times of the music pieces, the compression formats of the music files, the storage locations of the music files in the mobile telephone 20-1, and the like to the car audio apparatus 10 as the determination result (step S809). The car audio apparatus 10 receives and stores the determination result transmitted from the mobile telephone 20-1.

Next, the car audio apparatus 10 transmits the determination command to the MP3 player 20-2 (step S811). However, since the MP3 player 20-2 does not store the determination program, it does not execute the determination program if the MP3 player 20-2 receives the determination command transmitted from the car audio apparatus 10 at step S811.

Next, as in processing at steps S805 to S809, the car audio apparatus 10 transmits the determination command for executing the determination program to the MP3 player 20-3 and the MP3 player 20-3 executes the determination program stored therein and transmits the determination result at steps S813 to S817 and the car audio apparatus 10 transmits the determination command for executing the determination program to the PDA 20-4 and the PDA 20-4 executes the determination program stored therein and transmits the determination result at steps S819 to S823.

Display processing for the car audio apparatus 10 to display the determination results received at steps S809, S817, and S823 in the list format (step S825), edit processing to edit the displayed music list (S827), and music play processing to play a music file (S833) are similar to the processing shown at steps S725 to S733 previously described with reference to FIG. 7 in the second embodiment and therefore will not be discussed again.

After the music list is edited at step S827, the music pieces in the music list may be collected from the mobile telephone 20-1, the MP3 player 20-3, the PDA 20-4, etc., storing the music pieces. For example, all music pieces in the edited music list can be copied into the car audio apparatus 10 through the BT radio communication system from the information terminals 20 storing the music pieces and each music piece stored in the car audio apparatus 10 can be played according to a user's playback instruction.

Although the car audio apparatus 10 transmits the determination command to the MP3 player 20-2 at step S811, the MP3 player 20-2 does not store the determination program and therefore does not execute the determination program although the MP3 player 20-2 receives the determination command transmitted from the car audio apparatus 10. However, in the PAGING processing to form a piconet at step S803, the MP3 player 20-2 may be requested to transmit attribute information indicating whether or not the MP3 player 20-2 has the determination program and it is determined based on the received attribute information that the MP3 player 20-2 does not have the determination program, the determination program described in the second embodiment may be transmitted to the MP3 player 20-2.

As described above, according to the information processing system, the information processing method of the information processing system, the information processing apparatus, and the information processing program of the modification of the second embodiment according to the invention, the car audio apparatus 10 forms a piconet together with the information terminals 20 that can communicate information with the car audio apparatus 10 using the BT radio communication system so that information can be communicated in the piconet, and the car audio apparatus 10 transmits to each information terminal 20 that can communicate information with the car audio apparatus 10 and comprises the determination program for determining whether or not the information terminal 20 has content that can be processed in the car audio apparatus 10, the determination command for causing the information terminal 20 to execute the determination program. According to the received determination command, the information terminal 20 executes the determination program to determine whether or not the information terminal 20 has a music file that can be played in the car audio apparatus 10, and transmits the attachment information to the music file to the car audio apparatus 10, so that the car audio apparatus 10 can easily collect the playable music files from the information terminals 20 that can communicate information with the car audio apparatus 10.

The embodiments have been described by taking the car audio apparatus 10 as an example. However, the invention is not limited to the information processing system in a vehicle and may be applied to outdoor or in-house information processing systems; for example, an information processing apparatus (BT machine) such as a home server in a house and information terminals (BT machines) existing in the periphery of the information processing apparatus may be connected in a BT radio communication system so that they can communicate with each other.

The invention is not limited to the use of a BT radio communication system and can also be applied to other radio communication systems in a similar manner. A lighting circuit network using lighting circuits run throughout a general house to provide LAN connection may be used to connect the machines existing in the rooms of the house. Further, the invention can be applied not only to the radio communication systems, but also to the machines connected in a wired communication system.

In the above-described embodiments, in the BT radio communication system, the car audio apparatus 10 is used as the master and the mobile telephone 20-1, the MP3 player 20-2, and the PDA 20-4 are used as slaves. However, any of the mobile telephone 20-1, the MP3 player 20-2, or the PDA 20-4 may be used as the master for controlling other machines as slaves.

Further, as content, the music data is taken as an example. However, the invention can also be applied to moving picture data, image data, or an application program of a game, etc., in a similar manner. For example, MPEG2 format is determined by the determination processing described above in the embodiments, whereby only moving pictures can be collected from information terminals that can communicate information with the car audio apparatus 10. Consequently, the car audio apparatus 10 can collect data for each category of music files, moving picture files, still image files, and application programs of games, etc.

As described above, according to the invention, there can be provided the information processing system that can search for an information terminal that can communicate information with the information processing apparatus, establish information communications, determine and collect content which is contained in the information terminal and can be processed in the information processing apparatus, and easily prepare a content information list, the information processing method of the information processing system, the information processing apparatus, and the information processing program.

What is claimed is:

1. An information processing apparatus for processing any desired content, comprising:
   terminal search means for searching for information terminals that can communicate information with the processing apparatus;
   type information acquisition means for acquiring machine type information from the information terminals that can communicate information with the information processing apparatus and that are found by the terminal search means;
   attribute information acquisition means for determining a priority of the information terminals based on the machine type information and for acquiring attribute information of at least a particular information terminal of the information terminals based on the priority; and
   determination means for determining whether or not the particular information terminal has content that can be processed in the information processing apparatus based on the attribute information of the particular information terminal acquired by the attribute information acquisition means.

2. The information processing apparatus according to claim 1 further comprising content collection means for collecting any desired content from the information terminal determined to have content that can be processed in the information processing apparatus by the determination means.

3. The information processing apparatus according to claim 1, wherein the attribute information of the information terminal is information concerning one of content and a program that the information terminal has.

4. The information processing apparatus according to claim 1, wherein to determine whether or not the information terminal has content that can be processed in the information processing apparatus, the determination means extracts content information concerning the content that the information terminal has based on the attribute information of the information terminal and determines whether or not the content can be processed in the information processing apparatus based on the content information.

5. The information processing apparatus according to claim 1, wherein if the content is one of music data and moving picture data, the determination means determines whether or not bit rate information of the content is not more than allowable data transmission speed of a transmission channel for connecting the information terminal found by the terminal search means and the information processing apparatus.

6. The information processing apparatus according to claim 1 further comprising display means for displaying the content determined by the determination means that the content can be processed in the information processing apparatus.

7. The information processing apparatus according to claim 2, wherein the content collection means collects content by category based on the determination result of the determination means.

8. An information processing apparatus for processing any desired content, comprising:
   terminal search means for searching for information terminals that can communicate information with the information processing apparatus;
   type information acquisition means for acquiring machine type information from the information terminals that can communicate information with the information processing apparatus and that are found by the terminal search means,
   wherein the type information acquisition means determines a priority of the information terminals based on the machine type information; and
   determination request means for requesting at least a particular information terminal of the information terminals to determine whether or not the particular information terminal has content that can be processed in the information processing apparatus,
   wherein the determination request means requests the particular information terminal based on the priority.

9. The information processing apparatus according to claim 8, further comprising content information collection means for collecting content information concerning the content from the information terminal requested to make the determination by the determination request means.

10. The information processing apparatus according to claim 8, wherein the determination as to whether or not the information terminal has content that can be processed in the information processing apparatus in the determination request made by the determination request means is to determine whether or not the information terminal requested to make the determination has content, to extract content information concerning the content that the information terminal has, and to determine whether or not the content can be processed in the information processing apparatus based on the content information.

11. The information processing apparatus according to claim 8, wherein if the content is music data or moving picture data, a determination as to whether or not the information terminal has content that can be subjected to streaming processing in the information processing apparatus in a determination request made by the determination request means is to determine whether or not bit rate information of the content is equal to or less than allowable data transmission speed of a transmission channel for connecting the information terminal found by the terminal search means and the information processing apparatus.

12. The information processing apparatus according to claim 8, wherein the determination request made by the determination request means is to transmit a determination program for causing the information terminal that can communicate information with the information processing apparatus to determine whether or not the information terminal has content that can be processed in the information processing apparatus to the information terminal.

13. The information processing apparatus according to claim 8, wherein the determination request made by the determination request means is to transmit a command for causing the information terminal that can communicate information with the information processing apparatus to determine whether or not the information terminal has content that can be processed in the information processing apparatus to the information terminal.

14. The information processing apparatus according to claim 1, wherein the terminal search means searches for an information terminal that can communicate information with the information processing apparatus based on whether or not Bluetooth connection can be established.

15. The information processing apparatus according to claim 8, wherein the terminal search means searches for an information terminal that can communicate information with the information processing apparatus based on whether or not Bluetooth connection can be established.

16. The information processing apparatus according to claim 9, wherein the content information collection means collects content information by category based on the determination result of the determination means.

17. The information processing apparatus according to claim 7, wherein the category is one of music data, moving picture data, still image data, and a program.

18. The information processing apparatus according to claim 16, wherein the category is one of music data, moving picture data, still image data, and a program.

19. The information processing apparatus according to claim 9, further comprising display means for displaying the content information collected by the content information collection means.

20. The information processing apparatus according to claim 4, wherein the content information is at least one of compression format information, bit rate information, sampling rate information, and extension information of the content.

21. The information processing apparatus according to claim 9, wherein the content information is at least one of compression format information, bit rate information, sampling rate information, and extension information of the content.

22. An information processing program for causing a computer to provide functions of an information processing apparatus, the program comprising the steps of:
  searching for information terminals that can communicate information with the computer;
  acquiring machine type information from the information terminals that can communicate information with the information processing apparatus and that are found;
  determining a priority of the information terminals based on the machine type information;
  acquiring attribute information of the at least a particular information terminal of the information terminals based on the priority; and
  determining whether or not the particular information terminal has content that can be processed in the computer based on the attribute information of the particular information terminal acquired.

23. An information processing program for causing a computer to provide functions of an information processing apparatus, the program comprising the steps of:
  searching for information terminals that can communicate information with the computer;
  acquiring machine type information from the information terminals that can communicate information with the computer and that are found;
  determining a priority of the information terminals based on the machine type information;
  requesting at least a particular information terminal of the information terminals to determine whether or not the particular information terminal has content that can be processed in the computer,
  wherein the particular information terminal is requested based on the priority.

24. An information processing system comprising:
  an information processing apparatus; and
  information terminals that can communicate information with the information processing apparatus,
  wherein the information processing apparatus comprises:
    terminal search means for searching for the information terminals that can communicate information with the information processing apparatus;
    type information acquisition means for acquiring machine type information from the information terminals that can communicate information with the information processing apparatus and that are found by the terminal search means;
    attribute information acquisition means for determining a priority of the information terminals and for requesting attribute information of at least a particular information terminal of the information terminals based on the priority; and
    determination means for determining whether or not the particular information terminal has content that can be processed in the information processing apparatus based on the attribute information of the particular information terminal acquired by the attribute information acquisition means; and
  wherein the particular information terminal comprises attribute information return means for returning the attribute information of the particular information terminal requested by the attribute information acquisition means to the information processing apparatus.

25. The information processing system according to claim 24, wherein the information processing apparatus further comprises content collection means for collecting any desired content from the information terminal determined to have content that can be processed in the information processing apparatus by the determination means.

26. The information processing system according to claim 24, wherein to determine whether or not the information terminal has content that can be processed in the information processing apparatus, the determination means extracts content information concerning the content that the information terminal has based on the attribute information of the information terminal and determines whether or not the content can be processed in the information processing apparatus based on the content information.

27. The information processing system according to claim 24, wherein if the content is one of music data and moving picture data, the determination means determines whether or not bit rate information of the content is not more than allowable data transmission speed of a transmission channel for connecting the information terminal found by the terminal search means and the information processing apparatus.

28. An information processing system comprising:
  an information processing apparatus; and
  an information terminal that can communicate information with the information processing apparatus,
  wherein the information processing apparatus comprises:
    terminal search means for searching for information terminals that can communicate information with the information processing apparatus;
    type information acquisition means for acquiring machine type information from the information terminals that can communicate information with the information processing apparatus and that are found by the terminal search means, wherein the type information acquisition means determines a priority of the information terminals based on the machine type information; and determination request means for requesting at least a particular information terminal of the information terminals found to determine whether or not the particular information terminal has content that can be processed in the information processing apparatus, p2 wherein the determination request means requests the particular information terminal based on the priority; and wherein the information terminal comprises:

content determination means for determining whether or not the particular information terminal has content that can be processed in the information processing apparatus in response to the determination request made by the determination request means; and return means for returning content information of the content determined by the content determination means to the information processing apparatus.

29. The information processing system according to claim 28, wherein the information processing apparatus further comprises content information collection means for collecting content information concerning the content from the information terminal requested to make the determination by the determination request means.

30. The information processing system according to claim 28, wherein the content determination means determines whether or not the information terminal has content in response to the determination request made by the determination request means, extracts content information concerning the content that the information terminal has, and determines whether or not the content can be processed in the information processing apparatus based on the content information.

31. The information processing system according to claim 28, wherein if the content is one of music data and moving picture data, the content determination means determines whether or not the information terminal has content that can be subjected to streaming processing in the information processing apparatus based on whether or not bit rate information that the content information has is not more than allowable data transmission speed of a transmission channel for connecting the information terminal and the information processing apparatus.

32. The information processing system according to claim 28, wherein the determination request made by the determination request means is to transmit a determination program for causing the information terminal that can communicate information with the information processing apparatus to determine whether or not the information terminal has content that can be processed in the information processing apparatus to the information terminal; and wherein the content determination means makes the determination as the determination program is executed.

33. The information processing system according to claim 28, wherein the information terminal further comprises storage means for storing a determination program for determining whether or not the information terminal has content that can be processed in the information processing apparatus, and wherein the determination request made by the determination request means is to transmit a command for executing the determination program stored in the storage means.

34. An information processing method of an information processing system comprising the steps of:

searching for information terminals that can communicate information with the information processing apparatus;

acquiring machine type information from the information terminals that can communicate information with the information processing apparatus and that are found, determining a priority of the information terminals based on the machine type information; and requesting at least a particular information terminal of the information terminals to transmit attribute information, wherein the particular information terminal is requested to transmit the attribute information based on the priority;

returning the attribute information of the particular information terminal requested in the requesting step to the information processing apparatus; and determining whether or not the particular information terminal has content that can be processed in the information processing apparatus based on the attribute information of the particular information terminal returned in returning step.

35. The information processing method according to claim 34 further comprising the steps of collecting any desired content from the information terminal determined to have content that can be processed in the information processing apparatus in the determining step.

36. An information processing method of an information processing system comprising the steps of:

searching for information terminals that can communicate information with the information processing apparatus;

acquiring machine type information from the information terminals that can communicate information with the information processing apparatus and that are found;

determining a priority of the information terminals based on the machine type information; and requesting at least a particular information terminal of the information terminals to determine whether or not the particular information terminal has content that can be processed in the information processing apparatus; and determining whether or not the particular information terminal has content that can be processed in the information processing apparatus in response to the determination made by the particular information terminal.

37. The information processing method according to claim 36, further comprising the steps of collecting content information concerning the content determined in the determining step.

38. An information processing apparatus, comprising:

a receiver circuit that receives device type information from information terminals that can communicate information with the information processing apparatus;

a control circuit that determines a priority of the information terminals based on the device type information and that selects at least a particular information terminal of the information terminals based on the priority; and wherein the control circuit determines whether or not the particular information terminal has content that can be processed in the information processing apparatus.

39. The information processing apparatus as claimed in claim 38, wherein the control circuit determines whether or not the particular information terminal has the content before the information processing apparatus receives the content.

* * * * *